(12) United States Patent
Schulze et al.

(10) Patent No.: US 8,754,992 B1
(45) Date of Patent: Jun. 17, 2014

(54) INTERACTIVE REMOTE CONTROL PROGRAMMING METHOD

(75) Inventors: Kim W. Schulze, Seattle, WA (US); Roshan Menon, Hermosa Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 976 days.

(21) Appl. No.: 12/341,976

(22) Filed: Dec. 22, 2008

(51) Int. Cl.
*H04N 5/44* (2011.01)

(52) U.S. Cl.
USPC .......... 348/734; 348/725; 348/723; 348/585; 348/569; 348/563; 348/114; 348/211.4; 340/426.13; 340/4.11; 340/12.22; 340/815.6; 725/61; 725/67; 725/81; 725/100; 725/132; 725/135; 725/140; 725/151

(58) Field of Classification Search
USPC ............. 348/734, 114, 569, 563, 723, 725; 340/426.13, 4.11, 12.22, 815.6; 725/140, 81, 61, 135, 67, 100, 132, 725/151
See application file for complete search history.

(56) References Cited

U.S. PATENT DOCUMENTS

| | | | |
|---|---|---|---|
| 7,111,320 B1 * | 9/2006 | Novak | 725/139 |
| 7,378,984 B2 * | 5/2008 | Suzuki et al. | 340/12.51 |
| 7,889,112 B1 * | 2/2011 | Vergis et al. | 341/176 |
| 2004/0143847 A1 * | 7/2004 | Suzuki et al. | 725/61 |
| 2005/0110909 A1 * | 5/2005 | Staunton et al. | 348/734 |
| 2007/0069918 A1 * | 3/2007 | You | 340/825.69 |
| 2007/0094703 A1 * | 4/2007 | Nygaard et al. | 725/135 |
| 2007/0225828 A1 * | 9/2007 | Huang et al. | 700/11 |
| 2008/0191899 A1 * | 8/2008 | Lee | 340/825.22 |
| 2009/0070696 A1 * | 3/2009 | Belz et al. | 715/771 |

* cited by examiner

*Primary Examiner* — Jefferey Harold
*Assistant Examiner* — Mustafizur Rahman

(57) ABSTRACT

A system and method for programming a remote control includes pressing keys to enter a programming mode. State changes are communicated from the remote to a set top box. A user selects a device to be controlled and instructions are communicated to a user. The set top box tracks signals received from the remote corresponding to a device code entered by the user into the remote. A program guides and informs the user of programming success or failure based on signals received by the set top box. The remote includes a transmitter and runs a program associating a particular device code with a particular electronic device. The set top box includes a receiver for receiving signals from the transmitter and runs a program providing an interface on a display. The interface guides the user through programming in response to signals received by the set top box from the remote.

31 Claims, 12 Drawing Sheets

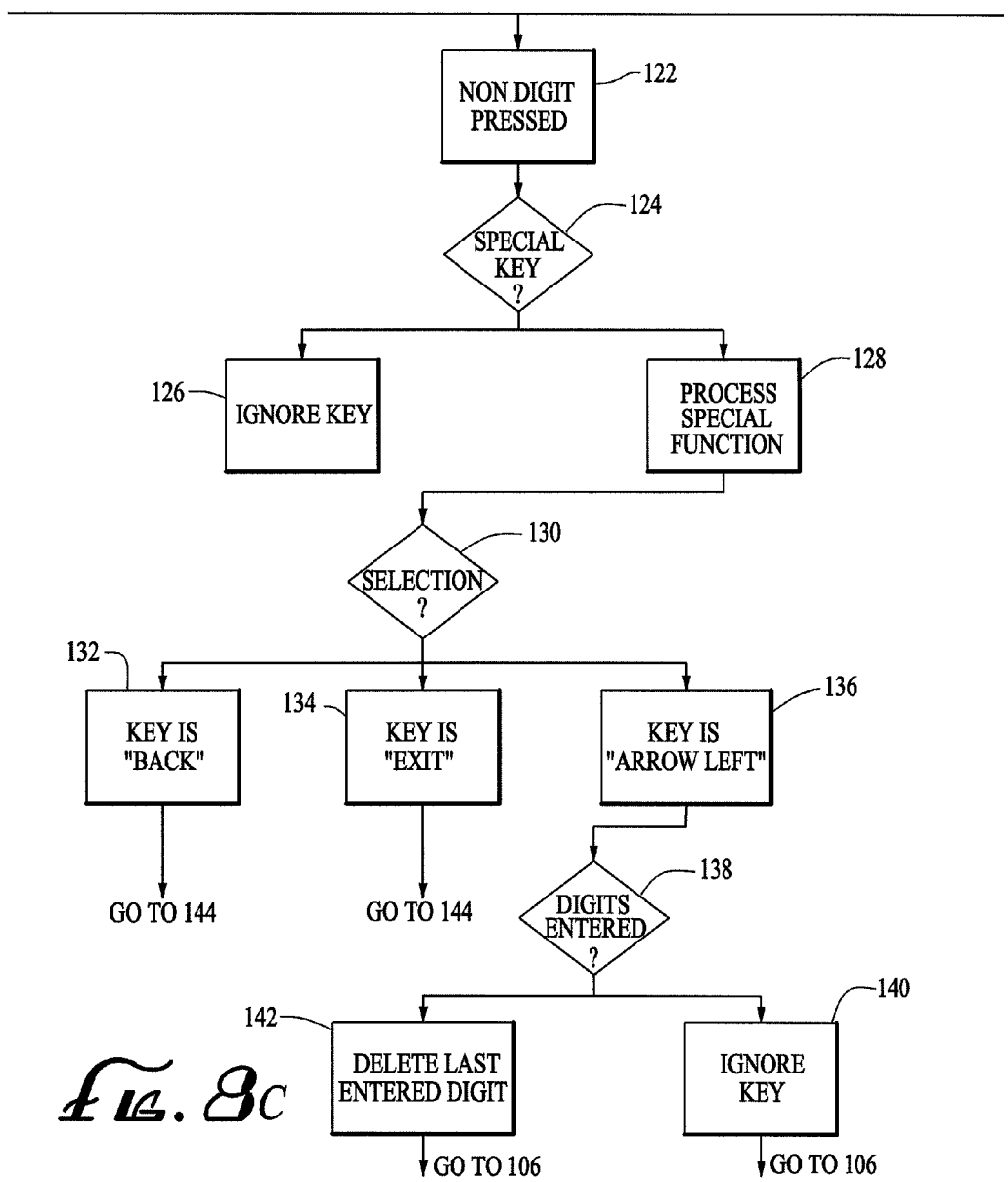

*fig. 9*A

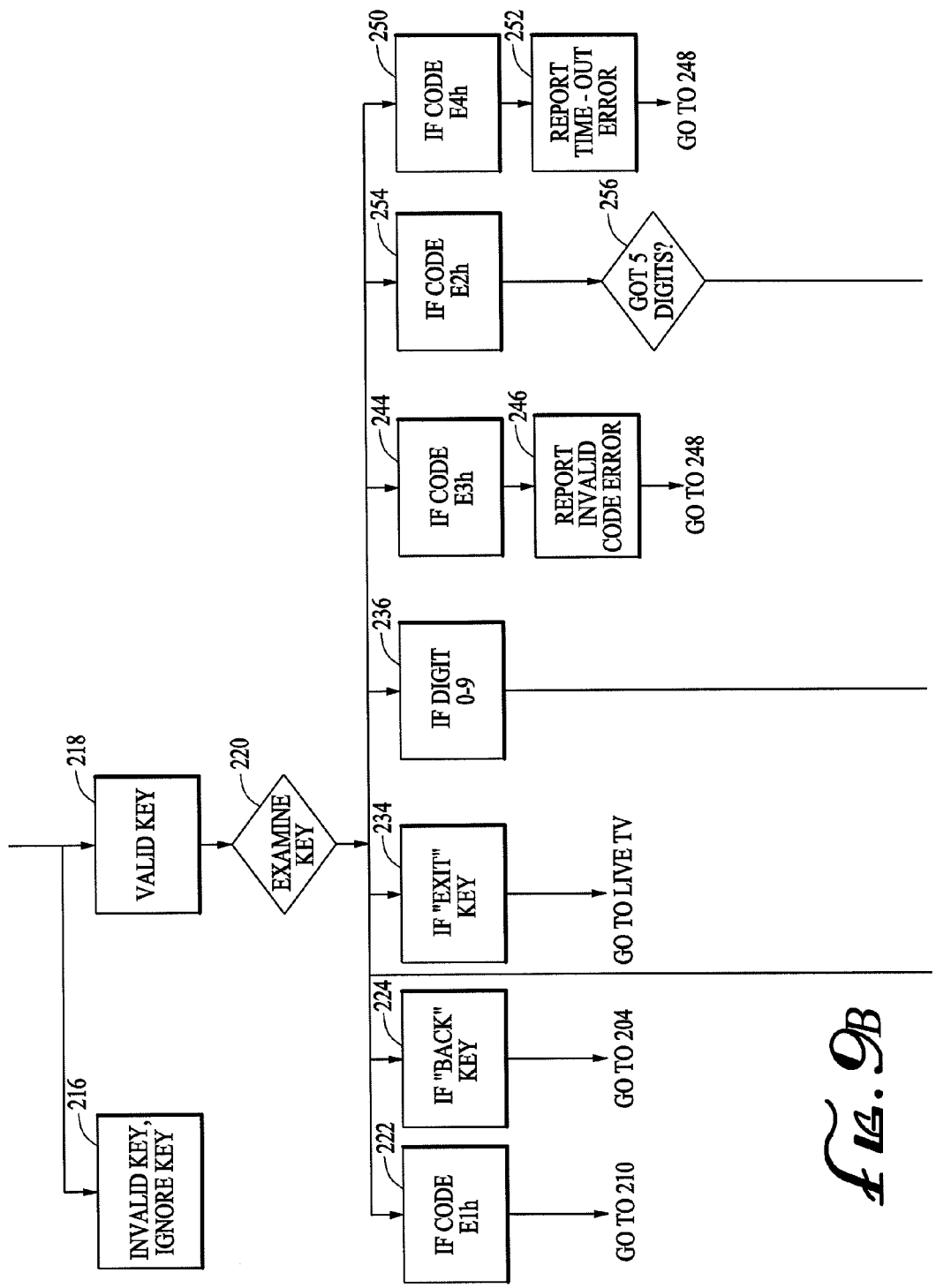

INTERACTIVE REMOTE CONTROL PROGRAMMING METHOD

BACKGROUND OF THE INVENTION

1. Area of the Art

The present invention relates generally to programming a remote control device. More particularly, the present invention relates to programming a remote control device using a set top box to provide feedback and guidance.

2. Description of the Background Art

A remote control device is an example of an electronic device used for the remote operation of a machine or electronic device. Typically, a remote control device is used to issue commands from a distance to a television (TV) or some other consumer electronic device (e.g., stereo systems, video cassette recorders (VCR), digital video disc (DVD) players, digital video recorders (DVR), etc.). In the 21st Century, many homes have so many consumer electronic devices that there may be as many as four or more remote control devices in just one room of any given home. For example, in order to operate a home theater system, a user may require one remote control device for a cable or satellite receiver, another remote control device for the VCR, a further remote control device for the DVD player, yet another remote control device for the TV and audio amplifier, etc. Often, these remote control devices must be used sequentially, and this can be confusing, unwieldy and frustrating to the user.

Remote control devices associated with these consumer electronic devices are usually small, wireless, handheld objects with an array of buttons for adjusting various settings such as channel/station, volume, on/off, etc. Most remote control devices are battery-powered and communicate to their respective associated devices via infra-red (IR) and/or radio frequency (RF) signals. Usually, a particular and/or unique IR or RF device code is assigned to the particular device the remote control device is communicating with and/or controlling. The device code is a number that represents a collection of device commands. The device code is determined by the manufacturer of a universal remote control and used to program the universal remote control to control other devices (e.g., TV, VCR, etc.). Each device command is a sequence of bits that may be transmitted through IR or RF in some pre-defined protocol (e.g. RC5). These device commands are selected by the original device manufacturer of the receiving device (e.g. the VCR or TV). Thus, each IR or RF device code identifies an associated collection of particular and/or unique IR or RF device commands. Each device command corresponds to a function on a device (e.g., "volume up", "volume down", "channel up", "channel down", "on/off" or the like). Thus, a user's selection of a particular device code automatically selects the device commands associated with that particular device code. The IR or RF device code is determined by the manufacturer of a remote control device associated with a particular electronic device (e.g., a TV, VCR, etc.) and may only function for that particular remote control model. Thus, an electronics manufacturer can assign a particular ER or RF device code (i.e., the device code itself comprising one or more device commands) to a specific brand/model TV set it manufactures and another particular IR or RF device code (comprising one or more device commands) to a specific brand/model VCR it also manufactures. Other electronics manufacturers use different IR or RF device codes (comprising one or more device commands) for their products.

A universal remote control device is a type of remote control device that can be programmed to operate various brands of one or more types of consumer electronic devices. Some universal remote control devices can only control a set number of consumer electronic devices, as determined by the number of device codes (and their associated device commands) programmed into the remote control device by the manufacturer of the universal remote control device, while other universal remote control devices allow the user to program in new control device codes (and their associated device commands) to the universal remote control device. Typically, universal remote control devices have built-in descriptions, commonly referred to as a code library or database, on how to communicate with other electronic devices such as TVs, VCRs, DVRs, DVD players and the like. These code libraries may be in the form of collections of device commands; each collection being identified by a particular device code. The code library or database stores all the device codes and their associated device commands. However, as new consumer electronic devices are constantly entering the marketplace, these code libraries become outdated over time and the remote control device must be updated to accommodate this. A printed list of device codes may come with the remote control device at the time the remote control device is purchased as either a stand-alone product or included with a consumer product (e.g., TV, VCR, etc.). The printed list of device codes represents device codes (and their associated device commands) already programmed into the remote control device.

Even remote control devices sold with a particular electronic device may include universal remote capabilities for other types of electronic devices, which allows the remote control device to control other electronic devices beyond the particular electronic device (e.g., a VCR remote programmed to operate various brands of televisions) the remote control device came with at the time of purchase. Large numbers of IR or RF device codes (and their associated device commands) for various brands and models of electronic devices can be stored within a memory of a remote control device (i.e., in a code library or database within the memory). As the number of electronic devices increases, the number of device codes and their associated device commands in the code library or database (stored in a non-volatile storage memory in the remote control device) also increases. The code library or database is loaded into the remote control device at the time the remote control device is manufactured. Most universal remote control devices sold today are device-based remote controls where the user presses a button associated with a desired electronic device (e.g., a TV) to select that electronic device (i.e., the TV) for control and then uses the remaining buttons to actually control the functions of that single electronic device (i.e., the TV). To start controlling another electronic device (e.g., a VCR), the user presses a different device button (i.e., the button marked "VCR") and the remote control device then starts sending commands to the new electronic device (i.e., the VCR). Typical "mode" buttons on this type of remote control device are labeled "TV", "DVD", "Receiver", etc. Each different type of electronic device (e.g., TV, VCR or the like) controlled by the same remote control device more than likely uses a different device code (i.e., the device code for the TV is different from the device code for the VCR even if both electronic devices were made by the same brand manufacturer).

A television set-top box (e.g., a satellite broadcast set-top box, a cable converter box, etc.) may also include a remote control code library or database having a number of device codes and associated device commands in order to aid a consumer in programming the remote control device associated with the set-top box to be used to control various other devices (e.g., a TV, a DVD player, an audio system, etc.). Typically, the term "set-top box" (STB) describes a device that connects to a TV and some external source of signal, and turns the signal into content then displayed on the TV screen. Before cable-ready TV sets, an STB known as a cable converter box was used to receive analog cable TV channels and convert them to video that could be seen on a regular TV. Cable converter boxes are still used to descramble premium cable channels and to receive digital cable channels through a coaxial cable that is operationally connected to a cable service provider. STBs are also well-known to consumers who subscribe to a satellite broadcast network. The subscriber's satellite dish picks up signals from a satellite (or multiple satellites) and passes the signals on to the STB (also known as an Integrated Receiver and Decoder (IRD)) in the subscriber's house. The STB processes the signals and passes the signals on to a TV connected to the STB where the signals are translated into a visual display.

Like the remote control device, as the number of different brands/models of consumer electronic devices increases, the database (stored in a non-volatile storage memory located in the STB) also increases. Like the code library or database in the remote control device, a code library or database is loaded into the STB at the time the STB is manufactured. A user seeking to control a desired electronic device (e.g., a TV) selects the programming or device codes stored in the code database of the remote control device or STB by selecting the type of electronic device (i.e., the TV) and brand name (e.g., SONY) of that electronic device (i.e., the TV) the user desires to program. The user can access these device codes through a set-up feature associated with the STB, as discussed below. The user programs the remote control device with one of the codes and tests the remote control device by trying to use the remote control device on the desired device (i.e., the TV). If the desired device (i.e., the TV) responds, programming is stopped. However, there is a chance that the desired device (i.e., the TV) may not work and another code may need to be entered. As with programming the remote control device using codes stored in the remote control device's code library or database, as outlined below, several device codes may be entered before the proper code for the desired device is found.

Problems arise when a user purchases a new and/or updated brand/model of electronic device (e.g., a new television, a new audio/stereo system, a new DVR, etc.) and the user's universal remote control device does not work with the new electronic device. Problems also arise when the user's old remote control device needs to be replaced and the new remote control device needs to be programmed for use with the user's current electronic devices. Manufacturers of consumer appliances and devices often reuse the same device codes on many similar devices (though for each manufacturer and device type, there are usually multiple device codes in use since there may be several different models of the same type of device made by the manufacturer). If a remote control device having universal remote functionality does not work with a particular new device that a consumer has purchased, the consumer can check the user's manual that came with the universal remote device when the consumer purchased it (i.e., if the user can even find his/her user's manual assuming that he/she even bothered to keep the user's manual), and then look up the appropriate device code for the particular device (i.e., brand, type of device, model, etc.) he/she purchased as well as the steps on how to program the remote control device to associate the appropriate device code with the new consumer electronic device. Although most users of remote control devices often have no difficulty operating a remote control device after the remote control device has been set-up and/or programmed for them, the very act of programming a universal remote control device can be a daunting process to technologically-unsophisticated individuals who have trouble understanding the programming instructions for the remote control device that require certain buttons to be pushed in certain sequences. A user will typically contact a customer service representative via telephone in order to learn the appropriate device code for the new consumer electronic device and be instructed in how to program the remote control device into associating the device code with the new consumer electronic device. The conversation with the customer service representative may turn out to be an exercise in futility and end up in frustration. Even if the conversation with the customer service representative is helpful to the user, telephone calls to customer service call centers can be costly when one adds up all the thousands upon thousands of code-related customer service calls made each year by consumers. In some cases, it may be necessary for either the customer, cable company or DBS provider to incur the expense of replacing the remote control device if the remote control device is not responsive to any of the device codes provided to the consumer.

Traditionally, there are two ways of programming a universal remote control device with device codes to operate a particular type/brand electronic device: (1) stand alone; and (2) through two-way communication. Stand alone programming is the most prevalent form of remote control programming. Stand alone programming requires the user to enter key strokes on the remote control device according to a guide, which may be printed or shown on a display. This method is often difficult for a user to complete, so steps have been taken to try to aid the user, such as providing feedback on the remote control itself via blinking lights to indicate the status of the remote. For the average user this is still a complex and error prone process.

Two-way communication programming resolves many of the problems associated with stand alone programming. The user can select what the remote control should be programmed to via a visual interface on the display controlled by the STB, and once selection has been done, the STB will send the necessary information to the remote control via a two-way communication link. The disadvantage of this methodology is that a two-way interface adds components in both the remote control device and in the STB. The cost of these components is around one U.S. dollar ($1.00) for the STB and remote control device combined. A company like DIRECTV, Inc. has upwards of 40 million STBs deployed so the cost of these additional two-way interface components can be quite expensive (e.g., a $40 million dollar cost for DIRECTV). Further, the two-way communication approach is not compatible with equipment already deployed in the field as hardware changes are necessary, making it a lengthy process to roll out.

There is a need for improving the stand alone programming model by a stand alone programming process mimicking a two-way programming process without the addition (or associated cost) of two-way interface components. There is a further need for an improved stand alone programming model that is compatible with the STBs already deployed in the field.

Traditionally, in the stand alone programming scenario, the remote control device's relationship with the STB is one of non-awareness. That is, the remote control device is just an extension of the control buttons located on the front of the STB. There is a need for stand alone remote control programming that increases STB awareness to include the programming of the remote control device.

FIG. 1 illustrates a conventional approach to programming a remote control device. This approach includes an on-screen guide 10 for programming a remote control device associated with the STB, where the on-screen guide 10 is shown on a screen 12 of a display associated with the STB. However, the on-screen guide is a passive step-through guide lacking any interactivity with the user. A user initiates the programming process by navigating to a setup screen on the STB, through a sequence of button presses on the remote control device. Programming mode for the STB is limited to the STB sending signals to the display (e.g., television) associated with the STB to display a list of codes and a lot of text, as seen in FIG. 1, and does not contain any awareness of the state of the remote control device. The graphics displayed on the TV screen are static. In the programming mode, the user selects the type/brand of electronic device that the user wants to program device codes for into the remote control device. After selecting the type/brand of electronic device, the user sees static graphics comprising the on-screen guide 10 that provide at least one device code associated with that brand/model of electronic device (e.g., eight device codes for an RCA TV are illustrated) provided that the code library of the STB includes device codes for the particular type and brand of electronic device that the user desires to program. The static graphics instruct the user to make a first step by moving a "MODE" switch on the remote control device to "TV." The second step instructs the user to then press "Mute+Select" keys on the remote control device until a light(s) (e.g., light emitting diode (LED)) above the "MODE" switch on the remote control device flashes twice. The only feedback provided to the user when the "Mute+Select" keys are pressed is the blinking of the LED on the remote control device. In the third step, the user is instructed to enter a device code. The device code is usually a string of numbers (e.g., five numbers). The user selects or enters the numbers corresponding to the device code chosen from the screen 12 by pushing number keys on the face of the remote control device. The static screen 12 does not indicate which number keys on the remote control device have been pressed by the user. The device code entered by the user using the keys of the remote control device is checked against an internal memory of the remote control device. The static screen 12 of the display does not indicate whether the code was successfully entered. That same static screen 12 merely provides that the user can test whether the attempt to program the remote control device with the device code worked by pressing the volume ("VOL") button on the remote control device. The static screen 12 instructs the user that if the volume of the TV did not change, the user is to repeat the second and third steps with the next code and that if no codes work, the user is instructed to move the "MODE" switch on the remote control device to "DIRECTV" and select "MORE CODES" (as seen on the on-screen guide 10) Either no confirmation is provided of whether the code was accepted or not, or the LED on the remote control device blinks (e.g., twice if ok, and one long blink if not, but the meaning of theses blinks and their respective durations is not communicated to the user by the on-screen guide 10 and the user may not recognize that these blinks of the LED have any significance at all). This conventional remote control programming is not a user-friendly process. If the user presses a wrong key, the remote control device leaves the programming mode. If a user fails to enter something (e.g., a code) properly, the remote control device leaves the programming mode. Thus, programming requires a lot of trial-and-error work that can require a frustrating amount of needless repetition. The on-screen guide 10 provides that if the TV volume did change, the user has the option to program "TV INPUT" by repeating the second step and entering code "860". To test, the user is instructed to press "TV INPUT." Other than that, the on-screen guide 10 informs the user that that the user is done with programming and that the user should the "MODE" switch to "DIRECTV" and select "DONE." Based on the foregoing, there is a clear need for an interactive guide/wizard that incorporates the extended awareness of the STB of the state of the remote control device. There is a further need for the remote control device to communicate its state to the STB because the STB gains awareness of the internal state of the remote control device. Once the STB gains awareness of the internal state of the remote control device, the STB can then communicate relevant and appropriate information to the user via the TV in the format of visual feedback.

As mentioned above, during conventional programming of the remote control device, the user presses a key sequence to enter a setup/programming mode on the remote control device. The user then subsequently enters keys on the remote control device to program the remote control device (with no feedback from the STB or TV). Also, the very process of a user switching their focus between looking at the display (to read the instructions on how to enter a code) and looking at the face of the remote control device (so that they can enter the proper code numbers) can lead to errors because no feedback is provided as to how many digits of the code that the user had entered or whether the user is even supposed to be trying to enter the code at that point. This conventional method is fairly error prone, and it is nearly impossible for the customer service representative (speaking with the user via telephone) to know where the user is in the programming process and be able to adequately guide the user through the process. This can result in great frustration and rage for the user which, in some cases, will be vented at the customer service representative.

There is a need for dramatically simplifying the programming of the remote control device by making the STB (as well as the user) aware of the state of the remote control device and by providing feedback to the user on the state of the programming of the remote control device. There is a further need for, at the same time, allowing for points of reference in the process to be shared with and communicated to the customer service representative by the user.

Conventional programming of the remote control device only provides feedback to the user through the LEDs located on a face of the remote control device. Furthermore, conventional programming requires that the user must know that two blinks of an LED means one thing and that four blinks of the LED mean another thing. A user manual for the remote control device may provide an explanation for what each number of blinks of the LED means but such manuals are frequently lost, misplaced or thrown out by the user. If the user presses the wrong key during conventional programming of the remote control device, there is no feedback indicating that a wrong key was pressed. If the remote control times out of programming mode or exits programming mode due to another error during conventional programming of the remote control device, the user is only informed by blinks of the LED on the remote control device. Thus, there is a need for an improved method of programming a remote control device that provides the user with feedback that is more informative than a particular number of blinks of an LED on the remote control device.

In view of the foregoing, there is a need for an improved method of programming a remote control device that provides a way for the remote control device to communicate state changes to the STB, and for the STB to then display what is going on in the remote control device in addition to guides and other information.

Accordingly, there is a need for all the improvements mentioned above with respect to programming a remote control device. There is also a need for a programming method that reduces the need to periodically replace remote control devices. There is a further need for a method of programming a remote control device that reduces and/or eliminates the need for a user to consult a customer service representative. There is an additional need for a method of programming a remote control device that uses existing communications connections between the remote control device and the STB. The present invention satisfies these needs and provides other related advantages.

SUMMARY OF THE INVENTION

The present invention involves the remote control device sending out IR/RF commands when entering, exiting and while in its programming state. The STB will use these commands to track the state of the remote control device and provide a user guidance on how to program the remote control device as well as inform the user of success or failure. The present invention is useful in a variety of ways. The present invention reduces the need for a consumer to speak with a customer service representative at a call center in order to program the remote control device. The present invention further reduces the need to periodically replace remote control devices. The improved programming method aims to make it easier for the user to program the remote control device.

The improved programming method can be applied to all STB and all remote control devices. The method can be used to simplify the programming of the remote control device and make the programming process easier for the user. In addition to increased customer satisfaction, it is projected that, over time, the number of customer service calls would be significantly reduced and that calls received by customer service would be shorter in duration. Currently DIRECTV, Inc. receives about 65,000 customer service calls a month related to remote control programming, at the cost of $440,000 a month. The improved method of programming the remote control device only requires software changes in the remote control device and software changes in the STB; making the cost associated with implementing the improved method practically insignificant. The remote control device communicates to the STB what state/mode the remote control device is in (e.g., in programming mode, exiting programming mode, etc.) and what keys are being pressed while in programming mode. The STB will track the state and keys being pressed on the remote control device and guides the user (via a user interface on the display (e.g., television) connected to the STB) through the programming process. Within its memory, the STB has a list of codes that the STB "knows" are codes associated with a particular brand of electronic device but does not "know" what the correct code is for the electronic device in question. The STB keeps track of codes that the user has tried to enter but that have proven to be the incorrect code for the particular electronic device. Once the user has programmed the correct code for a particular electronic device into the remote control device, the STB will store the association between the correct code and the particular electronic device in a memory within the STB. The improved method provides the advantage over the conventional use of blinking LEDS by providing feedback to the user on a display that clearly indicates whether programming was successful or a failure. The ability to see on the display where the attempt to program the remote control device failed helps the user recover from a failed attempt to program the remote control device much more quickly.

A method for programming a remote control includes pressing at least one of a plurality of keys on the remote control to enter a programming mode. State changes are communicated from the remote control to an STB. A particular device to be controlled by the remote control is selected. Programming instructions are displayed to a user. The STB tracks signals received from the remote control corresponding to at least one device code entered by the user into the remote control. The user is guided through programming and informed of programming success or failure based on signals received by the STB. Signals are transmitted from the remote control to the STB when entering, exiting or in the programming mode. Keys pressed on the remote control unit are mirrored on a display associated with the STB. The remote control is used to operate different controlled apparatus, where the different controlled apparatus are manufactured by a common manufacturer or different manufacturers. At least one device code associated with operation of the particular device is displayed. The particular device chosen by the user for programming can be a selected one of a television, a CD player, a DVD player, a DVR, a stereo system, a VCR, a personal computer, a personal digital assistant, a cable converter or an STB. A first code is transmitted from the remote control to the STB to indicate to the STB that the remote control is in the programming state. A display indicates that the remote control is ready for entry of the at least one device code. The at least one possible device code is then displayed and the user is prompted to enter the at least one possible device code using keys on the remote control. The display associated with the STB echoes numbers corresponding to signals received by the STB and transmitted by the remote control in response to presses of the keys on the remote control. A second code is transmitted from the remote control to the STB to indicate to the STB that the at least one device code was accepted and the remote control is now programmed with the at least one device digit code. The third code indicates to the STB that the at least one device code was not accepted and the user is prompted to enter another device code. The third code results in the user being informed that the at least one device code was not accepted, shows the user what possible device cedes remain available for the user to try, and instructs the user to re-enter programming mode. A fourth code is transmitted from the remote control to the STB to indicate to the STB that the remote control has left programming mode with out a device code having been programmed into the remote control. This informs the user that remote control programming failed and instructs the user to re-enter programming mode.

A system for guiding a user in programming a remote control capable of controlling a number of electronic devices via at least one device code specific to each electronic device includes a remote control having a transmitter and running a program associating a particular device code with a particular electronic device. An STB has a receiver for receiving a signal originating from the transmitter. A display is operationally connected to the STB, wherein the STB runs a program providing a graphical user interface on the display for guiding a user through associating the particular device code with the particular electronic device in response to signals received by the STB from the remote control device. The system includes a mechanism for initiating a programming mode in both the remote control and the STB for associating the particular device code with the particular electronic device. The remote control device includes a memory storing a device code database comprising a plurality of device codes and the program for associating the particular device code with the particular electronic device, and a microprocessor running the program. The STB includes a memory storing a device code database comprising a plurality of device codes and the program for providing a graphical user interface on the display for guiding the user through associating the particular device code with the particular electronic device in response to signals received by the STB from the remote control device, and a microprocessor running the program. The program running on the remote control is independent of the program running on the STB. The program running on the STB is reactive to signals received from the remote control device during programming of the remote control. The particular electronic device is a selected one of a television, a CD player, a DVD player, a DVR, a stereo system, a VCR, a personal computer, a personal digital assistant, a cable converter and an STB.

Other features and advantages of the invention will become more apparent from the following detailed description, taken in conjunction with the accompanying drawings, which illustrate by way of example, the principles of the invention.

DESCRIPTION OF THE FIGURES

The accompanying drawings illustrate the invention. In such drawings.

DETAILED DESCRIPTION OF THE INVENTION

Figure 1:
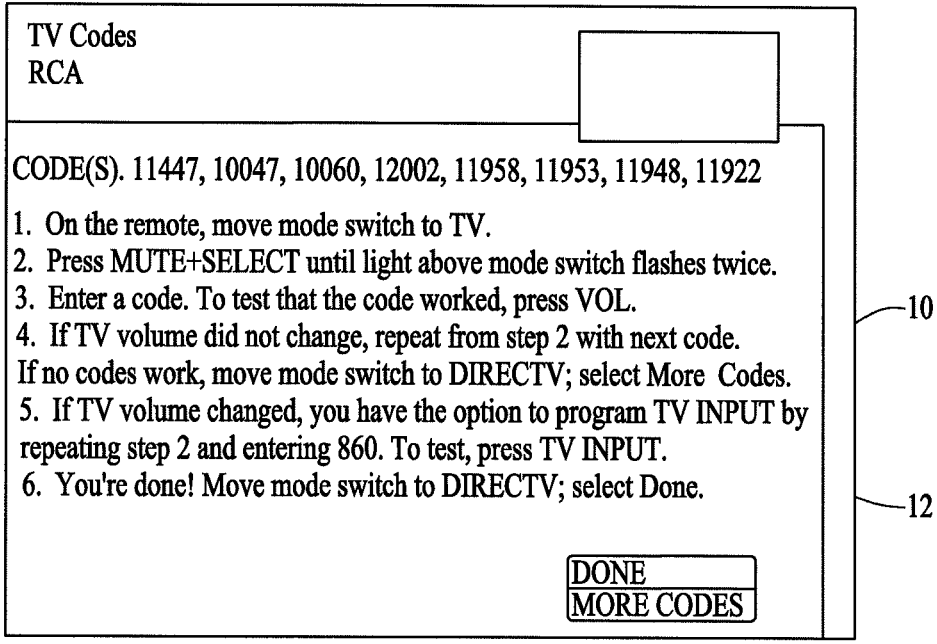
FIG. 1 illustrates a screenshot displaying static instructions for conventional programming of a remote control device.

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an improved method of programming a remote control device where an STB receives communications from a remote control device. The remote control device is able to communicate (send and/or receive) with the STB and/or another electronic device using various types of communication including, but not limited to, infra-red (IR), radio frequency (RF), visible light, audio/sonic signals or the like.

A consumer electronic device includes a remote control input that may be desirable to be controlled by the remote control device. The electronic device can come in various forms including, but not limited to, a television, a CD player, a DVD player, a DVR, a laser disk player, an audio/stereo system, an alarm system, a VCR, a personal computer, a personal digital assistant; a cellular telephone, a cable converter box, an STB or the like. The discussion, above and below, relates to a method to programming the remote control device that allows the remote control device to operate one or more of the foregoing electronic devices.

As seen in FIGS. 2-9, an STB 20 is in communication with a remote control device 40. The remote control device 40 is able to communicate (send and/or receive) with the STB 20 and/or another electronic device using various types of communication including, but not limited to, infra-red (IR), radio frequency (RF), visible light, audio or the like.

The STB 20 includes a controller 22 and a memory 24 storing a remote control configuration database/code library. The controller 22 communicates with the memory 24. The memory 24 may include various types of memory, including a flash memory. The controller 22 monitors the data within the remote control configuration database and retrieves the data as necessary from the memory 24. The controller 22 is in communication with an interface 26 that may include a key pad 28 directly on the STB 20 or a receiver module 30, or both. The receiver module 30 may include an RF, IR, audio or visible light interface for communicating with the remote control device 40. Various screen displays may be generated on a display 32 associated with the STB 20 during the programming of the remote control device 40. This aids the user's interaction with the STB 20 for the remote control device programming. The programming mode may be activated by using a button on the remote control device 40 or by using a button on the key pad 28 that will result in the controller 22 executing a software program within the STB 20 to enter into a setup/programming mode.

For purposes of illustration, the STB 20 is connected to the display 32 (in the form of a television which, in this case, serves as both the display 32 and one of the electronic devices to be controlled by the remote control device 40) for use during the programming of the remote control device 40. As discussed above, the STB 20 will have the code library, or at least portions of the code library stored in its memory 24. The remote control device 40 also has a code library. The code library is a database that contains the information for how the remote control device 40 should control electronic devices other than the STB 20 or the display 32. There is a file or record for each device code which is correlated in a table stored within the memory 24, 42. For purposes of illustration, a database record includes a record header that contains an identifier for the record in the form of a five (5) digit number. The record also includes an executor that describes how the remote control device 40 should communicate with a particular electronic device. The executor may be a simple reference to an already known protocol such as NEC or Philips RC5, or could be a description of a custom protocol. The record additionally includes a key set that describes how keys on the remote control device 40 match the keys on a remote control device that either originally came with a particular electronic device (or were designed to work with that particular electronic device) and what data should be sent on key presses of the remote control device 40. The respective code libraries of the STB 20 and the remote control device 40 are updated using known methods. Alternatively, a personal computer can be substituted for the set top box 20, and the computer's monitor serves as the display 32. A button(s) on the remote control device 40 or the key pad 28 of the STB 20 can be depressed to activate a software programs stored, respectively, in the memory 24 of the STB 20 as well as a memory 42 of the remote control device 40. The microprocessor or controller 22 of the STB 20 then runs a program that starts the graphical user interface, described above and below, that the user interacts with to program the remote control device 40 where this program uses data from the code library stored within the STB 20. Concurrently, a microprocessor or controller 44 of the remote control device 40 then runs a software program, described above and below, to program the remote control device 40 using data from the code library stored within the remote control device 40. Once the remote control process is activated through the interface 26, various screen displays may be generated on the display 32.

The processor or controller 44 of the remote control device 40 is coupled to the memory 42 which stores a code library similar and/or identical to the code library stored within the STB 20. The controller 44 may be used to control a transmitter module 46 that may be used to transmit RF, IR, audio or visible light signals to the interface 26 of the STB 20. A keypad module 48 generates various signals that are communicated through the transmitter module 46 and, ultimately, to the interface 26 of the set top box 20. The remote control device 40 includes a number of keys (not shown) in communication with the keypad module 48. The memory 42 may include a database of various types of configurations for the keys of the remote control device 40 so that the remote control device 40 can control various electronic devices. The keypad module 48, as described below, may be used to configure the remote control device 40 to a particular configuration within the remote control database within the memory 42. The keys of the remote control device 40 include, without limitation, a button for initiating a mode change, a "DIRECTV" button, a "SELECT" button, a power button, a "DVR" button, a video on demand (VOD) button, and a plurality of power/mode buttons such as a "CABLE" button, a "TV" button, an "AUDIO" button, and an "VIDEO" button for turning the corresponding device on/off and/or placing the remote control device 40 in one of a plurality of operating modes. During use of the remote control device 40, a user first typically selects the type of device to control by activating one of the mode buttons. Activation of one or more of the plurality of keys on the remote control device 40 generates a command signal that is supplied to the controller 44. In response, the controller 44 retrieves an appropriate control code from the memory 42 based on prior programming of the remote control device 40 by the user. The controller 44 then causes the transmitter module 46 to generate a signal in accordance with the control code retrieved from the memory 42. The signal is received by the STB 20 or any selected electronic device which then causes the selected device to have the desired response (e.g., press the "VOLUME" button on the remote control device 40 and the volume of the TV increases, press the "CHANNEL UP/CHANNEL DOWN" buttons on the remote control device 40 and the channel on the TV will go up or down as desired).

Referring to FIGS. 3-7, an overview of a process for programming a remote control device 40 is illustrated. For purposes of illustration only, the remote control device 40 is a DIRECTV remote control device. The screen displays of the graphical user interface (GUI) displayed on the display screen include various instructions and selections for programming the remote control device 40. The screen displays are generated by the controller 22 of the STB 20 in response to input received from the remote control device 40. The screen displays act as an instructional guide to programming the remote control device 40 by tracking key presses on the remote control device 40 and providing feedback to the user. A user activates programming function by depressing one or more keys on the keypad module 48 of the remote control 40 while pointing the remote control device 40 towards the set top box 20, using the transmitter module 46 to transmit RF, IR, visible light or audio (ultra-sonic, audible, sub-sonic) signals to the interface 26 of the set top box 20. Alternatively, the set top box 20 includes buttons/keys that can be used for setting up the programming process. Otherwise, the remote control device 40 instructs the set top box 20 to go into program mode by the user pressing and holding a key on the remote control device 40. After that, the remote control device 40 controls the process when the user make selections from choices shown on the display 32, with the STB 20 mirroring the entry of commands/pressing of buttons and illustrating the choices made on the display 32.

Once the remote control setup program is launched by the STB 20, the GUI on the display 32 displays a selection screen (not shown) for the user to choose an input. The user is prompted to press SELECT on the TV to program TV keys in all modes ("TV power," "TV input," "VOLUME," "MUTE," etc.). Alternatively, the user may be asked to select AV1 or AV2 to program the remote control device 40 to control a DVD, VCR, stereo or second DIRECTV receiver. The user can select the desired choice by using input keys on the keypad module 48 of the remote control 40. Once an input has been chosen, the GUI displays another selection screen (not shown) for choosing a product and a brand (provided the STB 20 does not already know the brand/type of electronic device or capability to automatically sense the brand/type of electronic device the STB 20 is connected to when the user seeks to program the remote control device 40 to control the display 32). The user manipulates the keys on the remote control device 40 to highlight or otherwise indicate the user's desired selection. Once the selection is highlighted or otherwise indicated, the user is prompted to press the SELECT button on the remote control device 40 on the product type and brand of the device the user wants to program into the remote control device 40. For purposes of illustration, and not limitation, a non-exclusive list of products displayed on the screen of the display 32 includes a DVD, stereo, VCR, DIRECTV Receiver, and a TV. Once the user manipulates the input keys on the keypad module 48 of the remote control 40 to highlight the desired electronic device on the display 32, the controller 22 of the STB 20 accesses information on the brand/type of electronic device in the remote control configuration database and displays device codes associated with that brand/type of electronic device. The user is then prompted to select the particular brand of the electronic device for which the user desires to program the remote control device 40. For example, it is illustrated that a TV has been selected and a list of brands (e.g., SONY, RCA, etc.) are displayed. Again, the keys of the remote control device 40 are used to highlight or otherwise indicate the desired brand selection (e.g., in this case, RCA is selected). If a brand is chosen, the user is then prompted by another selection screen of the GUI to choose a model by pressing SELECT on the model of the device the user wants to program into the remote control device 40. The selection screen illustrates various types of models in a model box. Numerous models may be available for any particular manufacturer. In this example, RCA model 1023 is selected.

Figure 3:
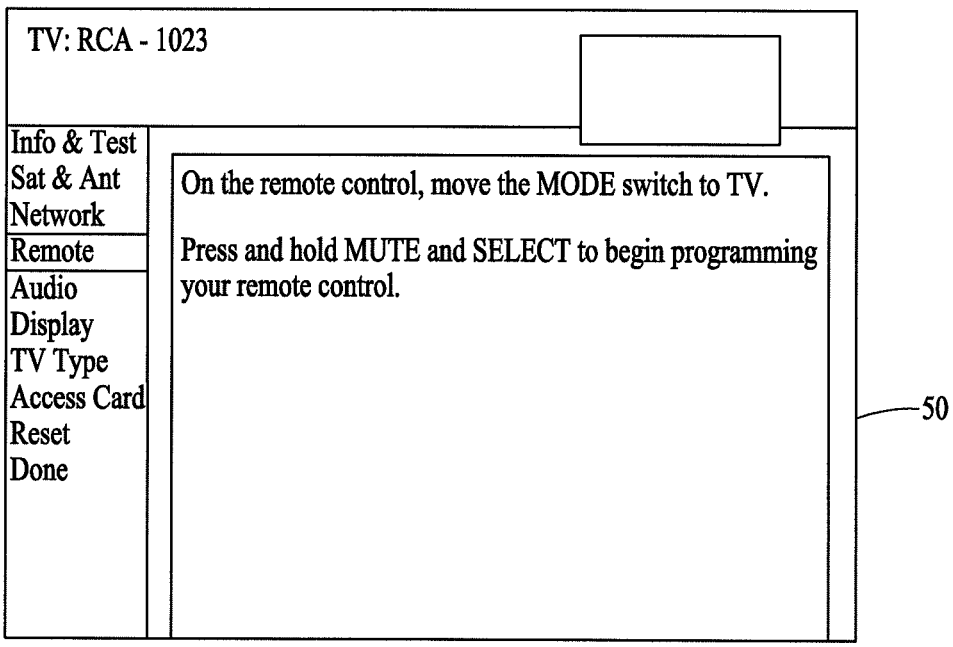
FIG. 3 illustrates an initial screen displaying a user interface providing instructions for programming of a remote control device according to an embodiment of the present invention.
Figure 2:
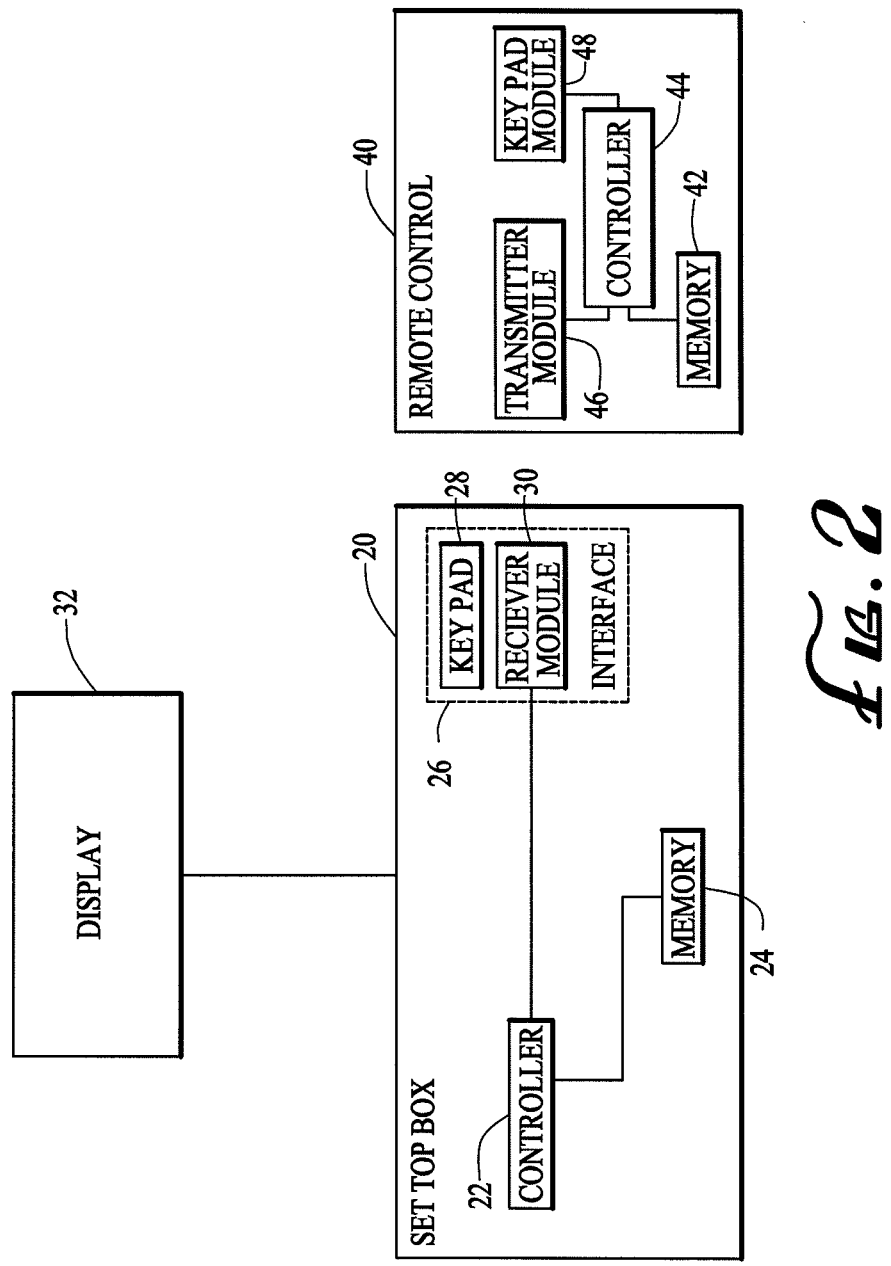
FIG. 2 illustrates a block diagrammatic view of a remote control device, STB and display used to carrying out programming of the remote control device.
Figure 4:
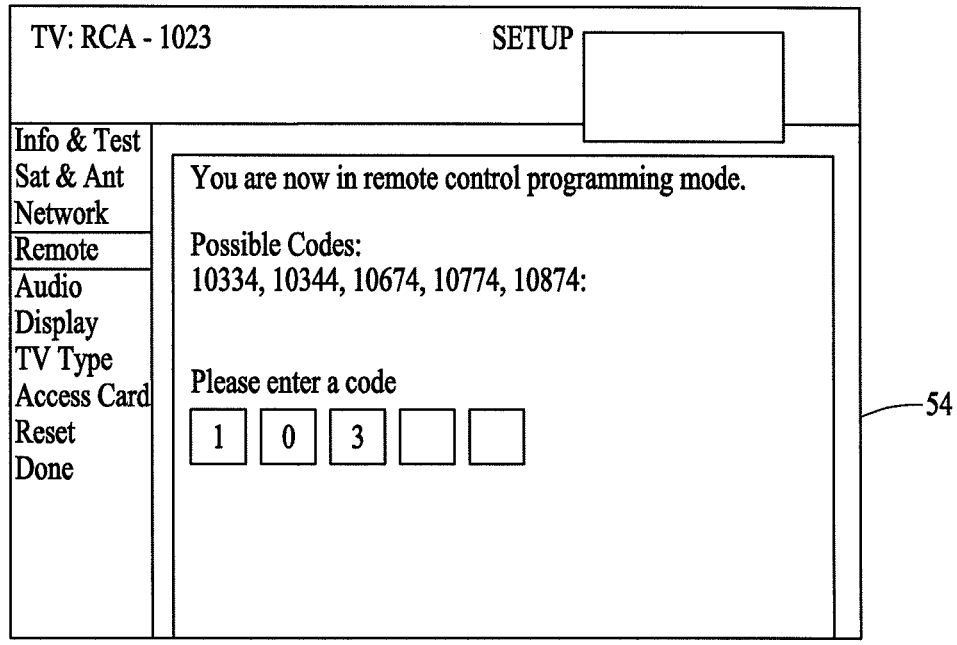
FIG. 4 illustrates a screenshot of a programming mode screen appearing in response to actions taken by the user suggested in the screenshot of FIG. 3.
Figure 7:
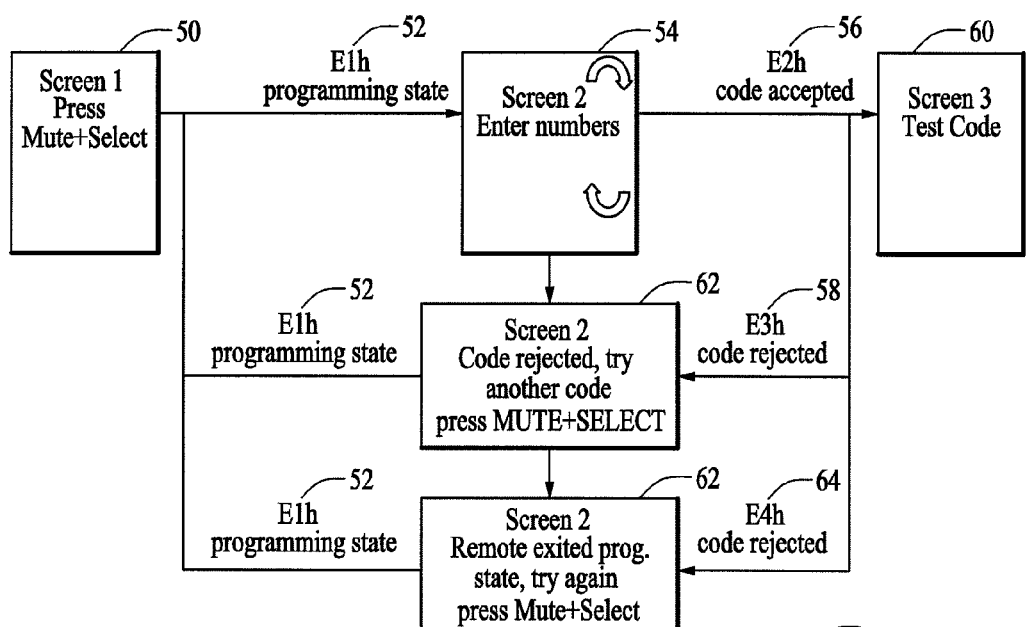
FIG. 7 illustrates a flow chart of an embodiment of the present invention.

Referring now to FIGS. 3 and 7, specific instructions in response to the selected model are displayed on a first remote control selection screen 50 for programming a remote control device 40 with a known model. On the first screen 50, the user is prompted to, on the remote control device 40, move the "MODE" switch to "TV." The user is then instructed to press and hold MUTE and SELECT ("Mute+Select" to begin programming the remote control device. An LED (not shown) on the remote control device 40, typically located above the keypad on the face of the remote control device 40, may flash twice. When the user presses "Mute+Select", the software running on the controller 44 of the remote control device 40 causes the remote control device 40 to enter a programming state and sends code "E1h" 52 to the STB 20 to indicate to the STB 20 that the remote control device 40 is in the programming state. Once the STB 20 receives this code ("E1h"), the GUI on the display 32 moves to a second screen 54, as seen in FIG. 4. This change of screens helps solve the problem where the user presses "Mute+Select" for too short a time or the remote control device 40 fails to capture the "Mute+Select" keying because the change of screens informs the user that the remote control device 40 is ready for the next step in the process of programming the remote control device 40 in a more user-friendly manner.

As illustrated in FIGS. 4 and 7, for RCA model 1023, there are five possible codes (e.g., 10334, 10344, 10674, 10774 and 10874) for the RCA model 1023 television. The screen 54 informs the user that the remote control device 40 is now in remote control programming mode. The graphics of the screen 54 display the possibly correct device codes for the RCA model 1023. The user is then prompted to enter one of the five possible codes using the remote control device's 40 number keys to enter the possible code. When the user enters the possible code, the remote control device 40 will echo the numbers (while in the programming state) and transmit the numbers chosen on the keypad 48 to the STB 20. Assuming the STB 20 is properly aligned with the remote control device 40, the STB 20 will receive these numbers and display the numbers on the screen 54 in the boxes provided, with one number key entry per box. Once all five (5) digits are entered, the remote control device 40 will send out one of the following: a code "E2h" 56 which indicates that the code (i.e., the five digit programming code) was accepted and the remote control device 40 is now programmed with this five digit code; or code "E3h" 58 indicating that the five digit programming code was not accepted. If the STB 20 receives code "E2h" 56, the STB 20 will move to a third screen 60, as seen in FIG. 6. If the STB 20 receives the code "E3h" 58, the STB 20 will display a new screen 62 (FIG. 5) that is a modified version of the screen 54 of FIG. 4. The screen 62 of FIG. 5 notifies the user that five digit programming code was not accepted and to try again. A line of text on the screen 62 could be used to notify the user of why programming went wrong. The five digit programming code(s) that have already been tried are still visible but grayed out during the session.

Figure 5:
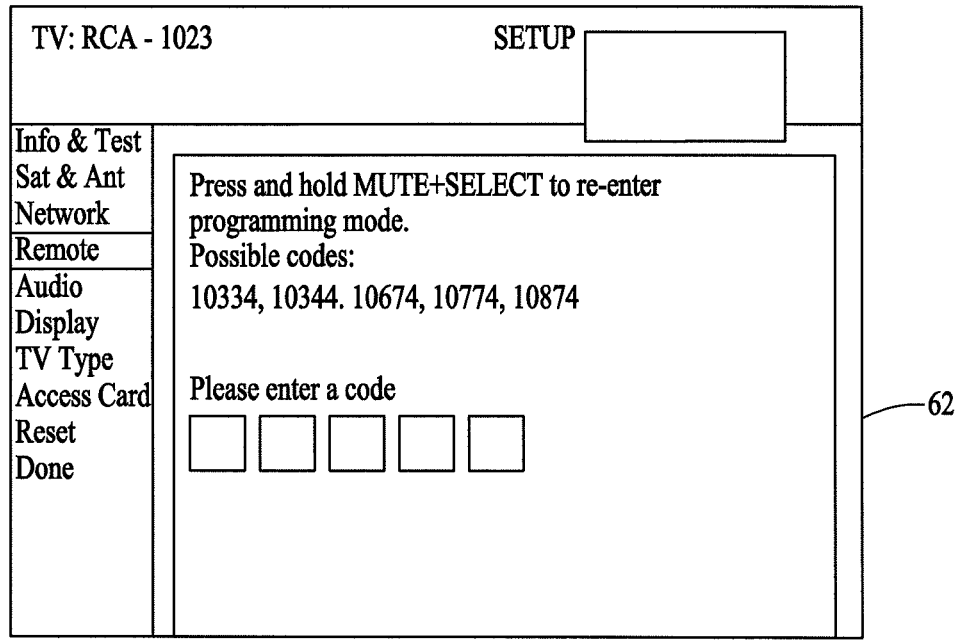
FIG. 5 illustrates a screenshot of the programming mode screen in response to the attempted entry of a wrong code.
Figure 6:
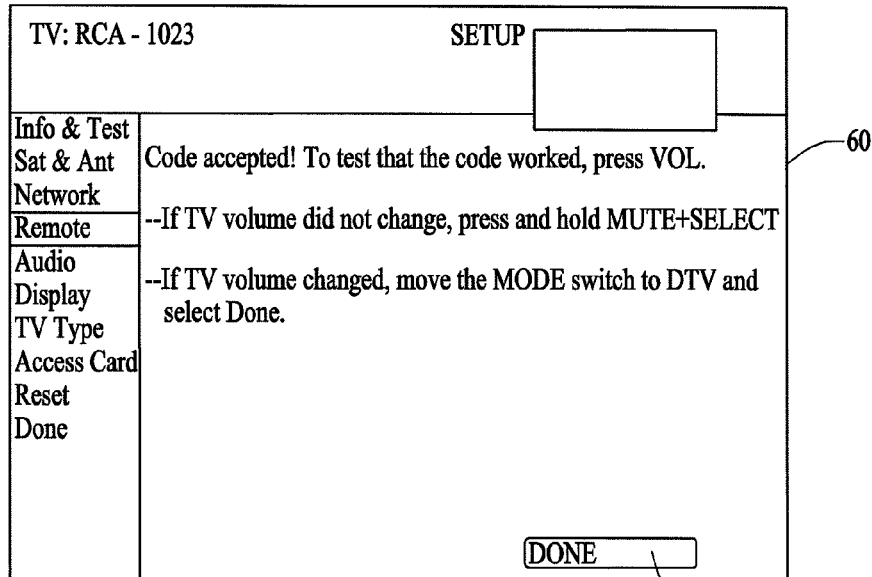
FIG. 6 illustrates a screenshot that appears after the screenshot of FIG. 4 in response to entry of an accepted code.

As seen in FIGS. 5 and 7, the user entered a wrong code. The user is instructed to press and hold the "Mute+Select" keys to re-enter programming mode. When the user presses "Mute+Select" keys, the software run on the controller 44 of the remote control device 40 causes the remote control device 40 to enter a programming state and sends code "E1h" 52 to the STB 20 indicate to the STB 20 that the remote control device 40 is in the programming state and the user is re-presented with the screen 54 of FIG. 4 (only with the five digit programming codes that have already been tried still visible but grayed out). Two types of code checking is performed by the software within, respectively, the remote control device 40 and the STB 20: (1) the remote control device 40 will report if the code was accepted or not; and (2) the STB 20 will check the entered numbers against the codes on the list of possibly correct five digit programming codes for the desired electronic device. This double-checking solves the problem created where the user enters numbers using keys associated with the keypad 48 of the remote control device 40 and the STB 20 misses (i.e., fails to receive) one or more of the signal bursts (e.g., IR, RF, etc.) from the remote control device 40. For example, the user enters "1" on the keypad of the remote control device 40 and the STB 20 receives a signal corresponding to "1" and displays a "1" in the first code box on the screen, then the user enter "0" on the keypad of the remote control device 40 but the STB 20 misses the transmission from the remote control device 40 and therefore does not display the "0" in the box on the screen; the user then enters "0" again since the "0" did not show up in the box and the STB 20 does receive and display this "0"; the user thereafter entering a "3" on the keypad of the remote control device 40 which is received by the STB 20 and shown on the display 40 as a "3" in the next box; the user then enters another "3" which is received by the STB 20 and shown on the display 40 a "3" next to the previously entered "3". At this point, the remote control device 40 has "10033" as the entered code (which, in fact, may be a valid code), but the STB 20 only has "1033" and is missing the "4" (since the code the user was trying to enter was actually "10334"). As "10033" is probably not on the list for this particular device, the user is notified that programming went wrong. Another failure would be that the user entered a code that is not on the list (e.g., "10335"). The remote control device 40 accepts code "10335," but since code "10335" is not for this electronic device (i.e., RCA model 1023), the system reports a failure, even though the remote control device 40 reports success in entering the code (i.e., the LED(s) on the remote control device 40 itself may flash to indicate a successful programming) because "10335" is a valid code for a device other than the device the user is attempting to program the remote control device 40 to control.

At any point in time, the remote control device may send out a code "E4h" 64 which indicates that the remote control device 40 has left programming mode with out a five digit programming code having been programmed into the remote control device 40. This can occur either because a "time-out" has occurred (e.g., ten (10) seconds have passed with no key presses on the remote control device 40 or no key presses received by the STB 20 from the remote control device 40) or because the user pressed another key (e.g., pressing "guide" would be a failure and cause E4h) on the remote control device 40 or by making a selection on one of the screens 54, 60, 62 to exit the programming mode. Pressing "Exit" does not cause an E4h as it is separately echoed and will take the user straight to Live TV. If the STB 20 receives the code "E4h" 64, the STB 20 will go to the screen of FIG. 5, notifying the user that remote control programming failed (from at least the perspective of the STB 20) and to try pressing the "Mute+Select" keys again in order to re-enter programming mode.

As seen in FIGS. 6 and 7, once the system indicates that the code has been accepted, the user can test the accepted five digit programming code. The user is then prompted to test that the code worked by press "VOL" (i.e., volume). If the TV volume did not change (i.e., the test is not successful), the user is instructed to press and hold the "Mute+Select" keys again in order to re-enter programming mode as seen in FIG. 4 and repeat the steps to enter another five digit programming code. If the TV volume changed, the user is instructed to move the "MODE" switch to "DIRECTV" ("DTV") and then select DONE. Note that while in the screen of FIG. 4 after a code "E3h" 58 or "E4h" 64, the STB 20 will not populate the five code boxes with digits until a code "E1h" 52 has been received again.

Figure 8A:
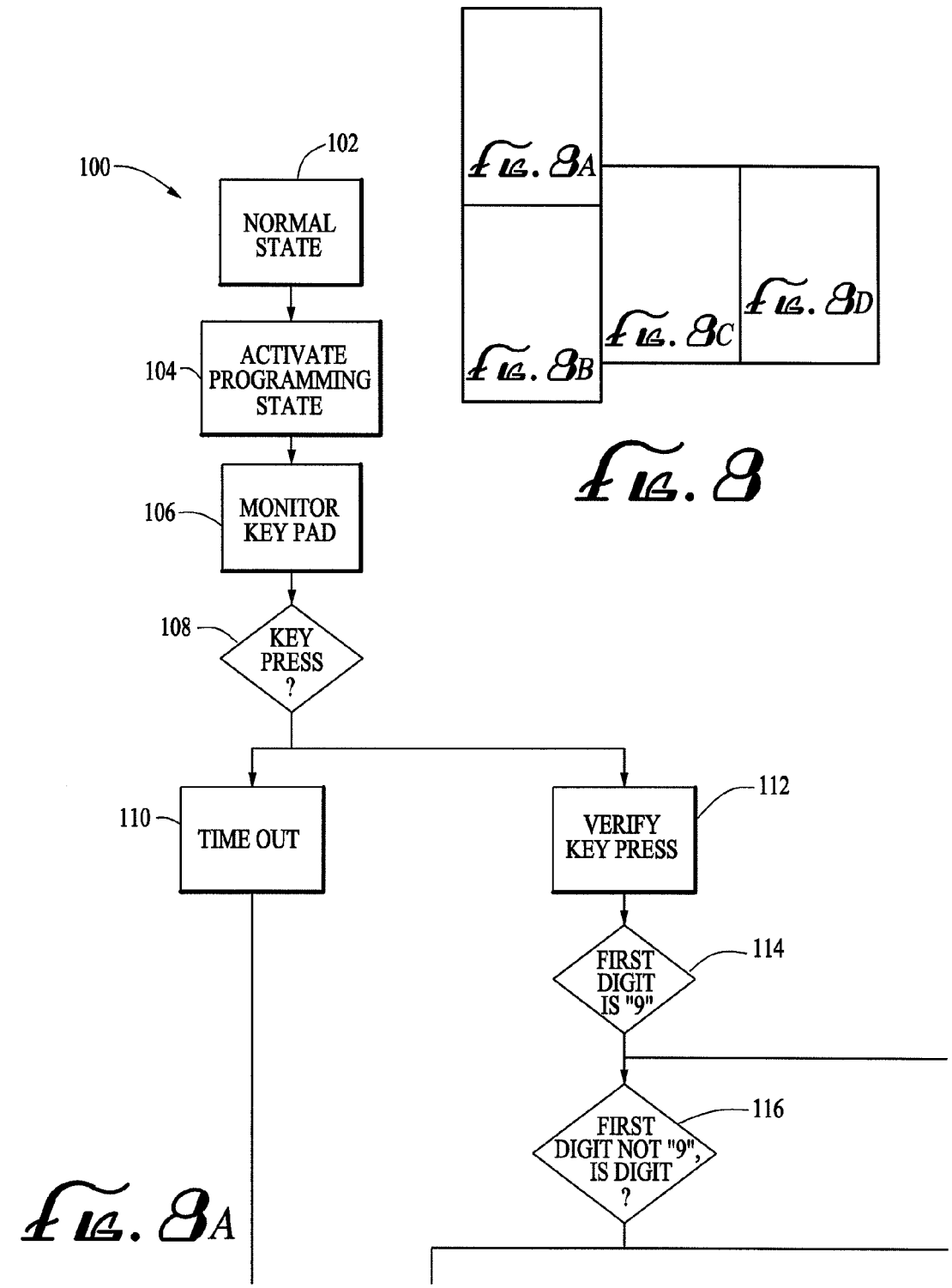
FIG. 8 illustrates an overview of a software flow chart (FIGS. 8A-8D) for the remote control device in an embodiment of the present invention.
Figure 8B:
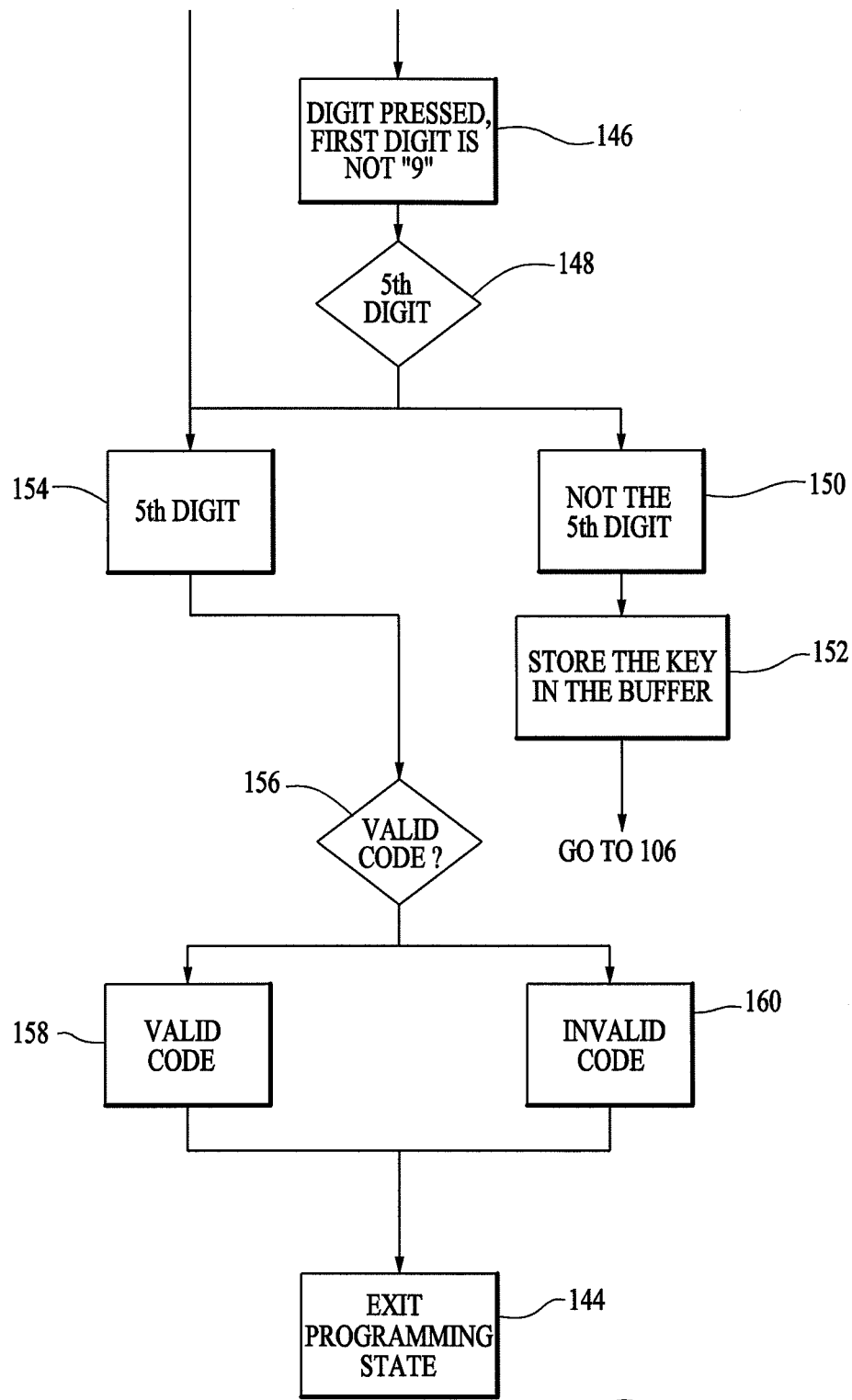
Figure 8D:
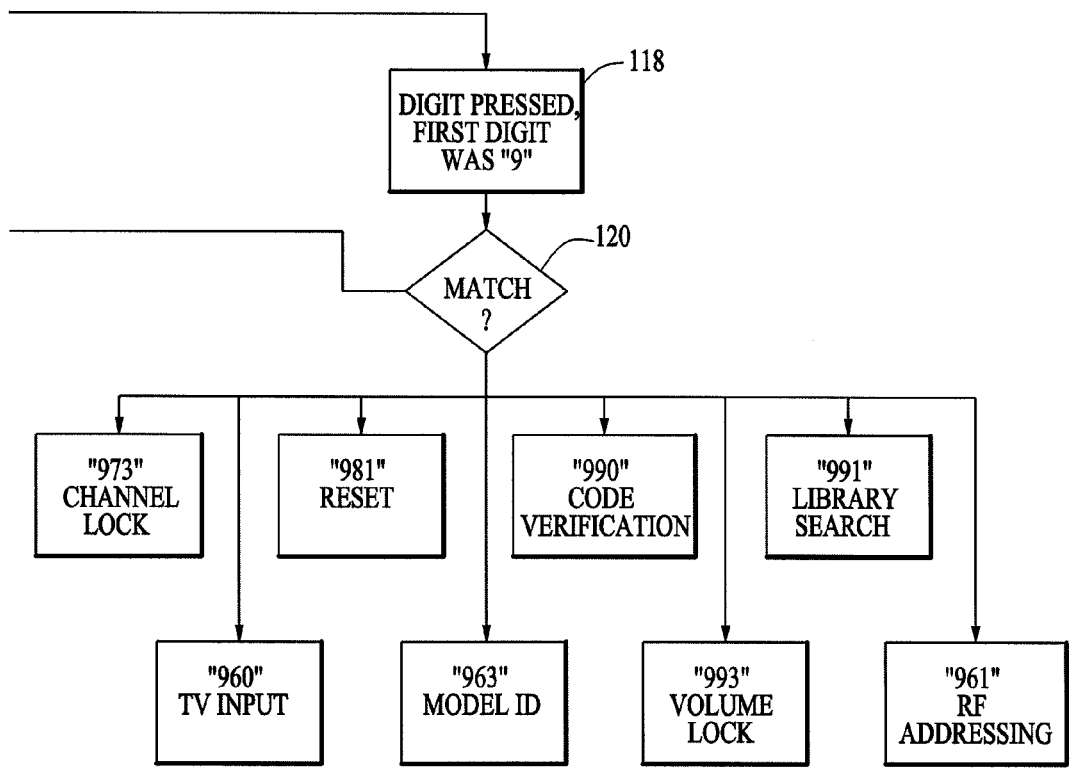

In use, a user begins a process 100 of programming the remote control device 40, from the perspective of the remote control device 40, by activating the STB 20 and associated display by pressing a power button on the remote control device 40, as seen in FIG. 8 (FIGS. 8A-8D). This sends a signal (e.g., IR, RF, visible light, audio, etc.) to the STB 20 and its associated display 32 to turn on. In the alternative, the user can manually turn on the STB 20 and its associated display 32 by pressing the respective power buttons of the STB 20 and associated display 32. The user presses additional buttons on the remote control device 40 to enter a normal state 102 in which the user has entered programming screens on the STB 20. Upon pressing the "Mute+Select" keys on the remote control device 40, the programming running within the remote control device 40 will move to the next step 104 which is to activate the programming state which, in turn, activates software programs and files within the remote control device 40 and the STB 20, respectively, which are designed to carry out the process 100. It should be noted that software in the remote control device 40 runs independently of software in the STB 20 (although the software in the STB 20 can react to input received from the remote control device 40) and the STB 20 has no control over the remote control device 40 (the software in the STB 20 may or may not react to input from the remote control device 40). In step 104, the programming state is activated in the remote control device 40 and the code "E1h" 52 is sent to the STB 20 to indicate this. In step 106, software executed by the controller 44 in the remote control device 40 will monitor for any presses of any keys associated with the keypad 48 on the remote control device 40. The software will determine if there has or has not been a key press 108 on the remote control device 40. If it is detected that a key has not been pressed for a period of time (e.g., ten (10) seconds) a time out 110 will occur, and the remote control device 40 will send code "E4h" 64 to the STB 20 to indicate that the remote control device 40 is leaving its programming mode/state 144 and the STB 20 will do likewise. However, if a key is pressed 112, the software will verify that the key is a valid key press. In this example, the software will verify 114 whether or not the key press involved a number of key presses where the first digit is a "9." If it is determined that the first key press is not a "9", the software will then determine 116 if the key press is even a digit. If it is determined that the first key press was a "9" 118, the software will then determine if the key press is a match 120 with one of several multi-digit codes that start with "9" (e.g., "973"—Channel Lock; "981"—Reset; "990"—Code verification; "991"—Library Search; "961"—RF addressing; "960"—TV input; "993"—Volume Lock; "963"—Model ID, etc.). If it is determined that a non digit has been pressed 122 instead of a "9" 118 or some other digit 116, then the software will determine if a special key 124 has been pressed. The software will ignore 126 the key press if the key does not have a special function. However, if the key indicates a special process function 128, the software will determine what special process has been selected 140. If the key is the "BACK" key, the software in the remote control device 40 will transmit a signal for the code for "BACK" to the STB 20 which will cause the software running in the STB 20 to change from what is currently shown on the display 32 back to an earlier, if not immediately previous, screen. If should be remembered that the remote control device 40 has no awareness of where the STB 20 is as the program in the remote control device 40 runs independent of the programming in the STB 20 and the remote control device 40 receives no feedback signalling from the STB 20. If the key is the "EXIT" key 134, the software in the remote control device 40 will transmit a signal for the code for "EXIT" to the STB 20 which will cause the software running in the STB 20 to exit the programming mode and the software running in the remote control device 40 will also exit the programming mode 144. If the key is an "ARROW LEFT" key 136, the software in the remote control device 40 will determine if digits have previously been entered 138. If not, the key press will be ignored 140. If digits have been entered, the software will delete the last entered digit from the buffer (memory) 142 and transmit a signal to the STB 20 which will cause the software running in the STB 20 to delete the last entered digit on the display 32. In either case, the software will go back to monitoring 106 the key pad 48 on the remote control device 40 for any key presses.

If the software in the remote control device 40 has determined that the key press is a digit 116, but the first digit pressed is not a "9" 146, the software in the remote control device 40 will then determine if the digit pressed is actually the fifth digit pressed 148. If the software executed by the controller 44 determines that the digit pressed is not the fifth digit pressed 140, the key press will be stored in a buffer (i.e., memory 42) 152 and the software will continue to monitor 106 the key pad 48. If the software executed by the controller 44 determines that the digit pressed is the fifth digit pressed 154, the software will check to see if the five digit code entered is a valid code 156. If the five digit code is valid 158, the remote control device 40 will send out code "E2h" 56 to the STB 20 to indicate that the five digit code was valid and the software will store the five digit code under the current mode switch setting on the remote control device 40 and the remote control device 40 will also exit the programming mode 144. If the five digit code is not valid 158, the remote control device 40 will send out code "E3h" 58 to the STB 20 to indicate that the five digit code was not valid and the remote control device 40 will exit the programming mode 144.

In the alternative, although the five digit code should already have been received at the STB 20, the software running on the controller 44 can send out the five digit code to the STB 20 when the remote control device 40 exits the programming mode 144. However, sending the five digit code again acts as a backup in case a digit transmitted from the remote control device 40 to the STB 20 was missed or not received by the STB 20.

Figure 9:
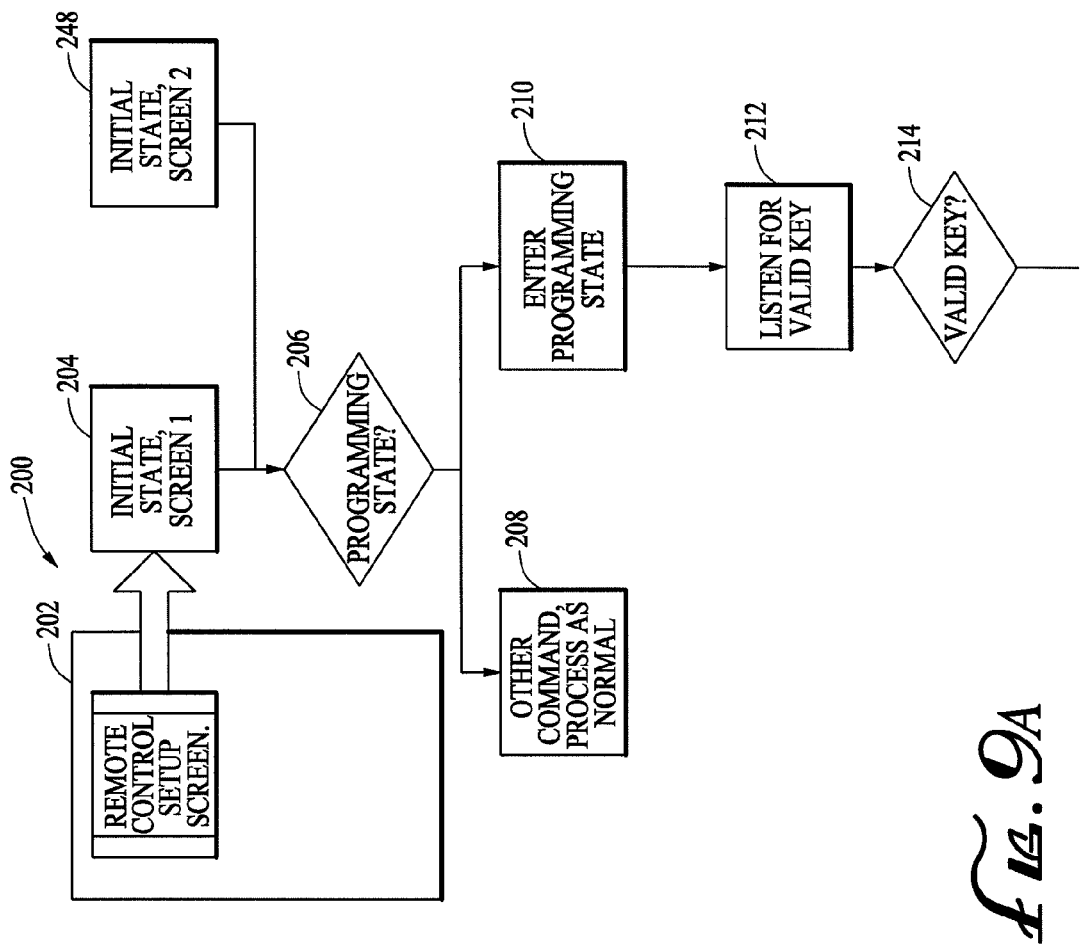
FIG. 9 illustrates an overview of a software flow chart (FIGS. 9A-9D) for the STB in an embodiment of the present invention.
Figure 9:
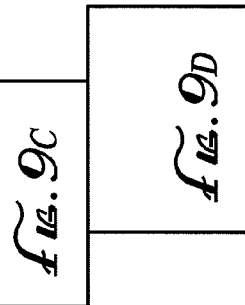
Figure 9C:
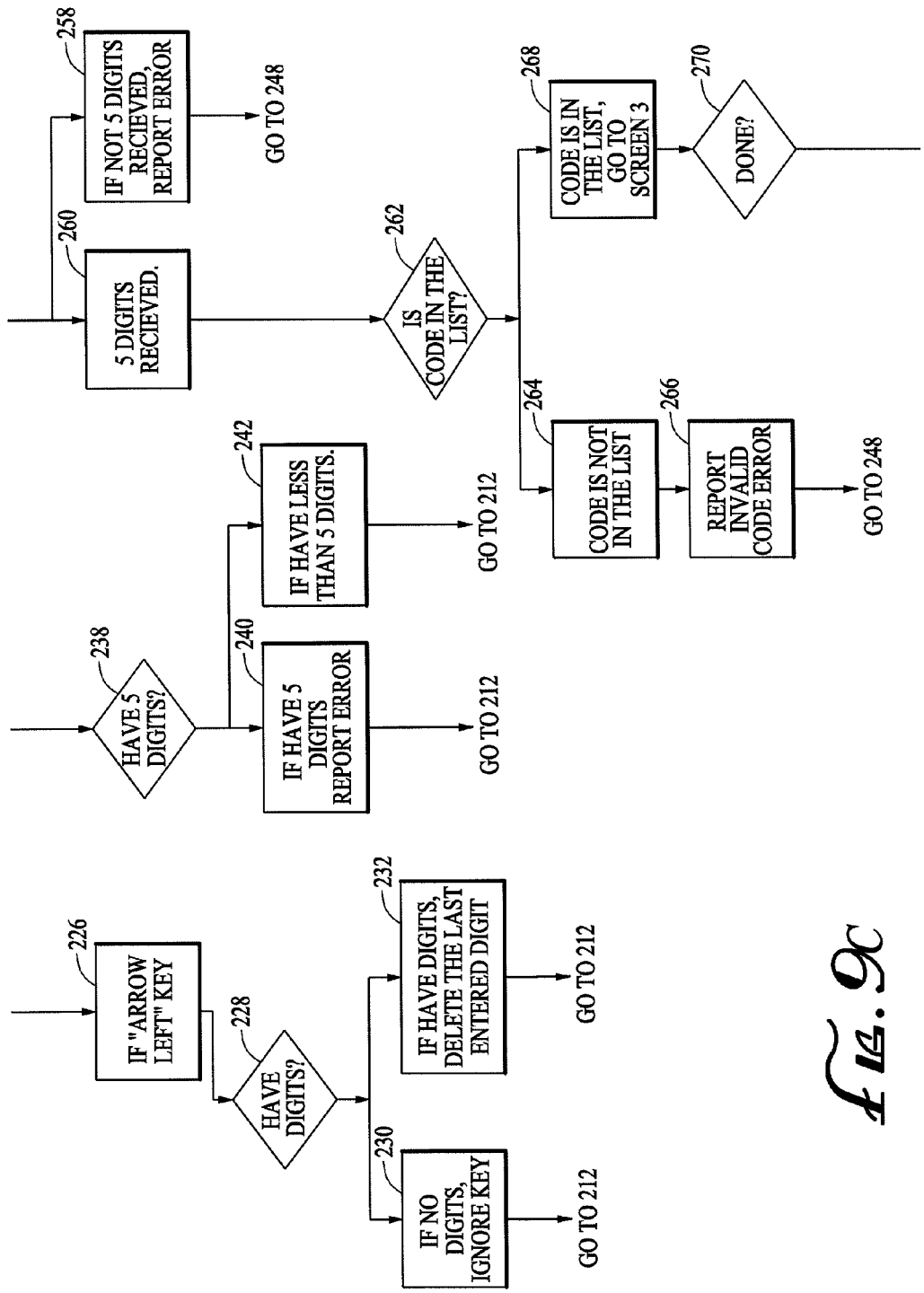
Figure 9D:
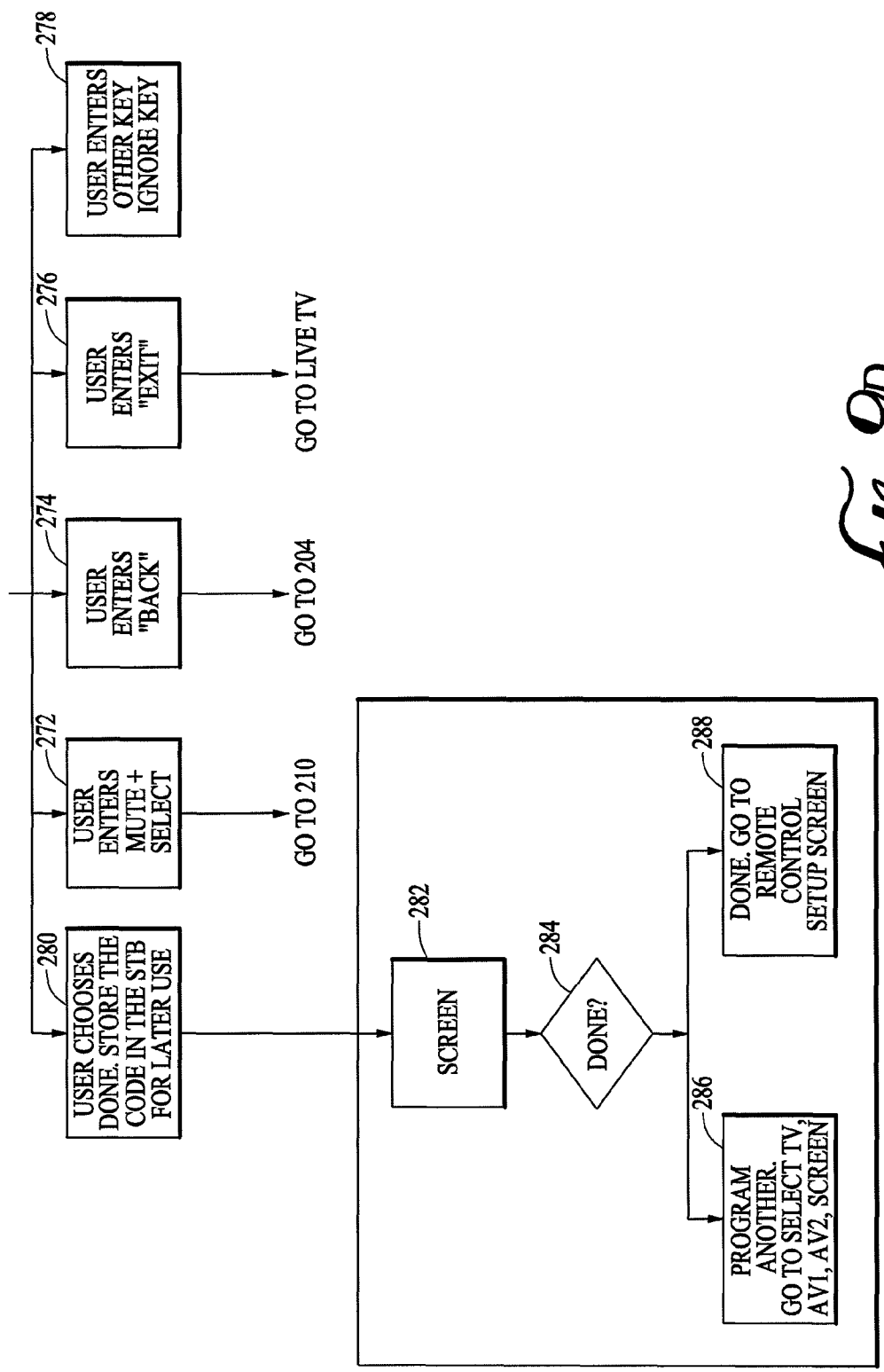

In use, a user begins a process 200 of programming the remote control device 40, from the perspective of the STB 20, by activating the STB 20 and associated display by pressing a power button on the remote control device 40, as seen in FIG. 9 (FIGS. 9A-9D). This launches software on the STB 20 that results in a remote control setup screen being displayed 202 to a user that provides the user with various options including "Program Remote." In this case, the user selects "Program Remote" or a similar selection heading in order to advance the process 200 to press highlight "TV" on the display 32 and press SELECT to program TV keys in all modes ("TV power," "TV input," "VOLUME," "MUTE," etc.). Alternatively, the user may be asked to select "AV1" or "AV2" to program the remote control device 40 to control a DVD, VCR, stereo or second DIRECTV receiver. The user can select the desired choice by using input keys on the keypad module 48 of the remote control 40. Once the type of device to program has been selected, the user selects a brand (provided the STB 20 does not already know the brand/type of electronic device or capability to automatically sense the brand/type of electronic device the STB 20 is connected to when the user seeks to program the remote control device 40 to control the display 32) by manipulating the keys on the remote control device 40. Depending on the key pressed on the remote control device 40, the remote control device 40 transmits a signal to the STB

20. If the STB 20 receives the signal, the user's desired selection will be highlighted or otherwise indicated on the screen on the display 32 associated with the STB 20. Once a brand is chosen, the user is then prompted by another selection screen of the GUI to choose a model by pressing SELECT on the model of the device the user wants to program into the remote control device 40. The selection screen illustrates various types of models in a model box. Numerous models may be available for any particular manufacturer. Once the model of the device to control is selected, the program will enter an initial state 204 and specific instructions will be displayed on the first remote control selection screen 50 for programming a remote control device 40 with a known model. On the first screen 50, the user is prompted to, on the remote control device 40, move the "MODE" switch to "TV." The screen on the display 32 further prompts the user to press and hold MUTE and SELECT ("Mute+Select") on the remote control device 40 to begin programming the remote control device 40. When the user presses "Mute+Select" on the remote control device 40, the software run on the controller 44 of the remote control device 40 causes the remote control device 40 to enter a programming state and sends code "E1h" 52 to the STB 20 indicate to the STB 20 that the remote control device 40 is in the programming state. Meanwhile, the software being run by the controller 22 of the STB 20 is trying to determine 206 if the STB 20 should enter the programming state. If the STB 20 receives a command code other than code "E1h" 52, the program will process this code accordingly 208. However, once the STB 20 receives code "E1h" 52 from the remote control device 40, the STB 20 will enter the programming state 210 and the GUI on the display 32 moves to a second screen 54, as seen in FIG. 4, which provides empty digital boxes (one for each digit of a five digit device programming code) and graphical lettering stating "You are now in remote control programming mode" or words to that effect. The GUI will also present possible codes matching the type/brand/model of the device to be controlled (e.g., for RCA model 1023, there are five possible codes: 10334, 10344, 10674, 10774 and 10874). The user is then prompted to enter one of the codes using the remote control device's 40 number keys to enter the code. Meanwhile, the software on the STB 20 is listening 212 for a valid key (i.e., the software running on the controller 22 is waiting to receive a transmission from the remote control device 40 corresponding to a valid key depressed on the remote control device 40. When the user enters the code by pressing a number key on the keypad 48 of the remote control device 40, the remote control device 40 transmits the selected digit to the STB 20. The software then determines 214 whether or not a valid key has been received. If an invalid key has been received 216, then the key is ignored. Valid keys include, but are not limited to "BACK", "EXIT", left arrow, the numbers "0" through "9", E1h, E2h, E3h, and E4h. If a valid key has been received 218, then the keys is examined 220. If code E1h is the valid key received 222, then the program will go to step 210 and enter the programming state. If the "BACK" key is received 224, the program will go to step 204. If the code for the left arrow key has been received 226, the box for displaying a number comprising one of the five digits of the device code is examined to see if a number comprising one of the five digits of the device code is present 228. If a digit is not present, the left arrow key is ignored 230 and the user is returned to step 212. If a digit is present, the last digit entered is deleted 232 and the user is returned to step 212. As there are five boxes on the screen in which five digits can be displayed, the left arrow key can be used to back track from the right-most box to the left-most box on the screen. If the "EXIT" key is received 234, the STB 20 will drop out of programming mode and go to live TV. If the code for one of the digits "0" through "9" is received 236, a determination is made if five digits have already been received 238 (in the situation where a device code to be programmed has five digits). If five digits have already been received, an error is reported 240 and the program goes back to step 212. If fewer than five digits have been received 242, one of the boxes is populated with the digit, the digit is stored and the program goes back to step 212. If code E3h is the valid key received 244, an invalid code error is reported 246 and a message is generated on the screen 62 (e.g., "You have entered an invalid code. Press and hold "Mute+Select" to re-enter programming mode." See FIG. 5) and the program goes to step 248 once the user has performed the instruction to press and hold the "Mute+Select" keys on the remote control device 40. In step 248, the program displays the screen 54 (FIG. 4) and the STB 20 is again in remote control programming mode. If code E4h is the valid key received 250, a time-out error is reported 252 and a message is generated on the screen 62 (e.g., "The remote control has timed out. Press and hold "Mute+Select" to re-enter programming mode.") and the program goes to step 248 once the user has performed the instruction to press and hold the "Mute+Select" keys on the remote control device 40. If code E2h is the valid key received 254, the E2h code indicates programming succeeded and the entered five digit device code is verified. A determination is made if five digits have been entered in the boxes 256 (in the situation where a device code to be programmed has five digits). If five digits have not been entered, an error is reported 258 and a message is generated on the screen 62 (e.g., "You have entered an invalid code. Press and hold "Mute+Select" to re-enter programming mode.") and the program goes to step 248 once the user has performed the instruction to press and hold the "Mute+Select" keys on the remote control device 40. If five digits have been received 260, a determination 262 is made if the five digit code matches at least one of the five digit device codes on the list of five digit device codes associated with the device to be controlled. If the received five digit code is not in the list of five digit device codes associated with the device to be controlled 264, an invalid code error is reported 266 and a message is generated on the screen 62 (e.g., "You have entered an invalid code. Press and hold "Mute+Select" to re-enter programming mode.") and the program goes to step 248 once the user has performed the instruction to press and hold the "Mute+Select" keys on the remote control device 40. If the received five digit code is on the list of five digit device codes associated with the device to be controlled 268, the screen 60 (FIG. 6) is displayed. The program monitors whether the "Done" button 66 on the screen 60 is selected by the user 270. If the user presses and holds the "Mute+Select" keys 272 on the remote control device 40 to re-enter programming mode, the program goes to step 210. If the user presses the "BACK" key on the remote control device and the "BACK" key code is entered and received 274 by the STB 20, the program will go to step 204. If the user presses the "EXIT" key on the remote control device and the "EXIT" key code is entered and received 276 by the STB 20, the STB 20 will drop out of programming mode and go to live TV. If the user presses any key other than one of the valid keys, the key code received by the STB 20 will be ignored 278. If the user highlights and selects the "Done" button 66 on the screen 60, the STB 20 will store the five digit device code in the STB 20 for later use 280 and go to a new screen (not shown) having selection buttons with dialog giving the user the choice to select either "Program another code" or "Done" 282. A determination 284 is made whether or not the user has selected "Done." If the user has selected to program another code 286, the display 32 will go back to the selection screen described above which allows the user to select the type of device to be programmed (e.g., the screen allowing the user to select "TV", "AV1", "AV2", etc.). If the user has selected "Done" (i.e., not to program another code) 288, the display 32 will go back to the remote control setup screen.

While the processes described above are illustrated using a DIRECTV remote control device, the process can include a user making a selection from a plurality of different types or models of remote control devices 40 (e.g., a remote control for a particular type/brand/model of electronic device, a universal remote control, etc.) to program. It should be noted that, at times, the keys on the STB 20 can be used during the programming process as an alternative to using the keys on the remote control device 40.

The system and method described above can be adapted to allow a remote control device to be programmed using a device other than an STB 20 and associated display (e.g., a personal digital assistant with built-in screen, a personal computer and associated monitor, an ipod with built-in screen, an iphone with built-in screen, a cellular telephone with built-in screen or any device described above or its equivalent having a memory and associated display). In a similar manner, the system and method described above can be adapted to allow a device other than a traditional remote control device to be programmed (e.g., a personal digital assistant, a personal computer, an ipod, an iphone, a cellular telephone or any device described above or its equivalent having a memory and capable of transmitting information to the STB 20).

Additional embodiments of the present invention may be made by combining various elements of one of the above-described embodiments with various elements of another one or more of the above-described embodiments.

The following claims are thus to be understood to include what is specifically illustrated and described above, what is conceptually equivalent, what can be obviously substituted and also what essentially incorporates the essential idea of the invention. Those skilled in the art will appreciate that various adaptations and modifications of the just-described preferred embodiment can be configured without departing from the scope of the invention. The illustrated embodiment has been set forth only for the purposes of example and that should not be taken as limiting the invention. Therefore, it is to be understood that, within the scope of the appended claims, the invention may be practiced other than as specifically described herein.

What is claimed is:

1. A method for programming a remote control comprising:
    pressing at least one of a plurality of keys on the remote control to enter a programming mode for programming the remote control to communicate with a set top box;
    communicating state changes from the remote control to the set top box;
    selecting a particular device to be controlled by the remote control;
    displaying programming instructions to a user on a display associated with the set top box;
    tracking, by the set top box, signals received from the remote control corresponding to at least one device code entered by the user into the remote control;
    guiding the user through programming; and
    informing the user of programming success or failure of programming the remote control based on signals received by the set top box;
    wherein communicating the state changes comprises:
        transmitting a first code from the remote control to the set top box to indicate to the set top box that the remote control is in the programming mode; and
        transmitting a second code from the remote control to the set top box to indicate to the set top box that a first device code was not accepted at the remote control.

2. The method of claim 1, wherein the communicating step includes transmitting signals from the remote control to the set top box when entering, exiting or in the programming mode.

3. The method of claim 1, wherein the tracking step includes mirroring keys pressed on the remote control on the display corresponding to signals received by the set top box and transmitted by the remote control in response to presses of the keys on the remote control.

4. The method of claim 1, further comprising the step of using the remote control to operate different controlled apparatus, wherein the different controlled apparatus are manufactured by a common manufacturer or different manufacturers.

5. The method of claim 4, wherein the selecting step further comprises the step of displaying the at least one device code associated with operation of the particular device.

6. The method of claim 5, further comprising the step of using the at least one code to operate the particular device.

7. The method of claim 4, wherein the selecting step further comprises the step of choosing the particular device comprising a selected one of a television, a CD player, a DVD player, a DVR, a stereo system, a VCR, a personal computer, a personal digital assistant, a cable converter or a set-top box.

8. The method of claim 1 further comprising, in response to the first code, indicating on the display that the remote control is ready for entry of the at least one device code.

9. The method of claim 1, including the steps of displaying at least one possible device code and prompting the user to enter the at least one possible device code using keys on the remote control.

10. The method of claim 9, further comprising echoing on the display associated with the set top box, numbers corresponding to signals received by the set top box and transmitted by the remote control in response to presses of the keys on the remote control.

11. The method of claim 1 wherein the communicating step includes the step of transmitting a third code from the remote control to the set top box to indicate to the set top box that a second device code was accepted and that the remote control is now programmed with the second device code.

12. The method of claim 1, wherein the step of transmitting the second code includes the step of indicating the first device code that was not accepted and possible device codes that remain available for the user to try.

13. The method of claim 1, wherein the step of transmitting the second code includes the step of instructing the user to re-enter the programming mode.

14. The method of claim 1, wherein the communicating step includes the step of transmitting a third code from the remote control to the set top box to indicate to the set top box that the remote control has left the programming mode without a device code having been programmed into the remote control.

15. The method of claim 14, wherein the step of transmitting the third code includes the step of informing the user that remote control programming failed and instructing the user to re-enter the programming mode.

16. A system for guiding a user in programming a remote control capable of controlling a plurality of electronic devices via at least one device code specific to each electronic device, comprising:

a remote control having a transmitter and running a program associating a particular device code with a particular electronic device;

a set top box having a receiver for receiving a signal originating from the transmitter;

a display operationally connected to the set top box, wherein the set top box runs a program providing a graphical user interface on the display for guiding a user through associating the particular device code with the particular electronic device in response to signals received by the set top box from the remote control; and means for initiating a programming mode in both the remote control and the set top box for associating the particular device code with the particular electronic device;

wherein the remote control is configured to transmit a first code to the set top box to indicate that the remote control is in a programming mode, and the remote control is further configured to transmit a second code to the set top box in response to an unacceptable device code being entered at the remote control.

17. The system of claim 16, wherein the remote control includes a memory storing a device code database comprising a plurality of device codes and the program for associating the particular device code with the particular electronic device, and a microprocessor running the program.

18. The system of claim 16, wherein the set top box includes a memory storing a device code database comprising a plurality of device codes and the program for providing the graphical user interface on the display for guiding the user through associating the particular device code with the particular electronic device in response to signals received by the set top box from the remote control, and a microprocessor running the program.

19. The system of claim 16, wherein the program running on the remote control is independent of the program running on the set top box.

20. The system of claim 16, wherein the program running on the set top box is reactive to signals received from the remote control during programming of the remote control.

21. The system of claim 16, wherein the particular electronic-device is a selected one of a television, a CD player, a DVD player, a DVR, a stereo system, a VCR, a personal computer, a personal digital assistant, a cable converter and a set-top box.

22. A method for programming a remote control comprising:

transmitting a first code from the remote control to a set top box to indicate to the set top box that the remote control is in a programming mode; and receiving a first device code entered by a user into the remote control;

transmitting a second code from the remote control to the set top box, the second code indicating that the first device code was not accepted by the remote control.

23. The method of claim 22, further comprising transmitting a third code from the remote control to the set top box to indicate to the set top box that the remote control has left programming mode without an accepted device code.

24. An interactive remote control programming method comprising:

a set top box receiving a first code transmitted from a remote control, the first code indicating that the remote control is in a program mode;

in response to the first code, the set top box displaying a first prompt on a display associated with the set top box, the first prompt prompting a user to enter a first device code into the remote control; and in response to a second code received from the remote control, the set top box displaying a second prompt on the display, the second prompt indicating that the first device code was not accepted and prompting entry of another device code.

25. The method of claim 24, wherein the second prompt includes one or more other possible device codes.

26. The method of claim 24, further comprising:

the set top box receiving user input signals from the remote control, the user input signals corresponding to numeric values; and the set top box echoing the numeric values to the display.

27. The method of claim 24 further comprising:

in response to a third code received from the remote control, the set top box displaying a failure message and a prompt for the user to re-enter programming mode.

28. A remote control comprising:

a user interface for receiving user input;

a transmitter for transmitting electrical signals to a second device; and a memory comprising a plurality of recognized device codes;

wherein the remote control is configured to respond to a mode input received via the user interface by entering a programming mode and transmitting a first code to the second device;

wherein the remote control is further configured to receive a first device code via the user interface, and transmit a second code to the second device if the first device code is not one of the plurality of recognized device codes.

29. The remote control of claim 28, wherein the remote control is further configured to transmit a third code to the second device when the remote control exits the programming mode without receiving one of the plurality of recognized device codes via the user interface.

30. A set top box comprising:

a remote control interface for receiving signals from a remote control; and a display interface for controlling a graphical user interface of an associated display;

wherein the set top box is configured to respond to a first code received from the remote control interface by displaying on the graphical user interface a programming mode prompt for a user to enter a first device code into the remote control;

wherein the set top box is further configured to respond to a second code received from the remote control interface by displaying on the graphical user interface an indication that the first device code was not recognized by the remote control, and displaying a prompt for the user to enter a second device code.

31. The set top box of claim 30, wherein the set top box is further configured to respond to a third code received from the remote control interface by displaying a programming failure message and prompting a user to re-enter program mode.

* * * * *